UNITED STATES PATENT OFFICE.

JOHN L. KELLOGG, OF BATTLE CREEK, MICHIGAN.

PROCESS OF PREPARING POWDERED BEVERAGE EXTRACT.

1,149,066. Specification of Letters Patent. Patented Aug. 3, 1915.

No Drawing. Application filed October 13, 1913. Serial No. 794,845.

*To all whom it may concern:*

Be it known that I, JOHN L. KELLOGG, a citizen of the United States, residing at Battle Creek, county of Calhoun, in the State of Michigan, have invented certain new and useful Improvements in Processes of Preparing Powdered Beverage Extract, of which the following is a specification.

This invention relates to improved powdered extract for use in the manufacture of beverages and the like, and the process of making the same.

The objects of the invention are to provide an extractive material in granular form which can be very readily dissolved to form a beverage such as cereal coffee or coffee substitute or the like.

I accomplish the objects of my invention by the means described in the following specification.

The invention is defined and pointed out with claims.

In carrying out my invention I take a mixture of grain of equal proportion of wheat and rye. I first thoroughly clean the grain, with the usual wheat cleaning machinery made use of by millers, I then roast the same by any means as in an ordinary coffee roaster to a light amber brown. I grind the grain and sift it to uniform fineness, care being taken not to unduly pulverize the material. I then take sweet fruits, figs being much preferred, although it is possible to use such fruits as dates, apricots, prunes or dried apples, and thoroughly wash and pulverize the same by any suitable means, and then cover with water and cook the same down to a thick syrupy mass. Into this syrupy mass I mix the roasted ground grain. It thus becomes very thick, and is very readily shaped into pellets, about the size of a pea or bean, by forcing the same through an ordinary food or meat chopper. The pellets thus produced are thoroughly air dried by any suitable method, either by steam coils or in drying ovens or in vacuum driers, and when thoroughly dried in this way, the material is roasted until the pellets are a dark brown color. This roasting process, which is done in a coffee roaster, requires from 20 to 60 minutes, depending upon the degree of heat used. These roasted pellets are then mixed with water and boiled or steeped to obtain the extractive material therefrom.

The roasted pellets are mixed with water and cooked to obtain the extract, after the manner of steeping coffee. About six gallons of water to one of the roasted pellets secures very good results, or in about that proportion. The cooking or boiling process requires from thirty minutes to two hours, and should be continued until all of the extractive matter has been dissolved and separated. The entire mass is then taken from the cooker and placed in a percolator or filter where the clarified extract is drawn off. The mass should be washed and pressed until this extractive process is fully complete. The extract is then boiled down in the usual vacuum pan to a thick syrupy condition, having substantially the consistency of New Orleans molasses. This syrup is then dried by delivering the same into a rotary drum vacuum drier. As a substitute step this syrup may then be partially dried in a shelf vacuum, and then taken out and placed in a hot oven; that is, an oven from 250° to 300° heat. The same is left there for a short time, usually a few minutes, until the entire mass has become very hot and there has been formed all through the same small bubbles. This bubbly mass is then taken out of the oven and very quickly placed in a vacuum drier where the entire mass is completely dried. After this mass has been dried, it is pulverized to a coarse powder, although the same may be reduced to an impalpable powder. A solution of the same in hot water will be found to be a strong beverage closely resembling coffee in flavor. A level teaspoonful of the powdered extractive material in a teacup of hot water will produce a very strong beverage. This coffee substitute resembles coffee very closely in flavor and has the general characteristics of coffee but does not have the alkaloids or tannin of coffee present or any similar objectionable substances. The flavor of course can be considerably varied by changing the amount of fruit or grain, and the character of the same.

I desire to claim the invention broadly, and I also desire to claim the same in the specific form which I have found to be most effective and satisfactory, as pointed out in the appended claims.

Having thus described my invention, what I claim as new and desire to secure by Letters Patent is:

1. The process of preparing powdered beverage extract consisting of roasting wheat and rye to a light brown color, and grinding and grading to a coarse powder, cooking fruit to a thick syrupy mass, mixing the roasted ground grain therewith and forming the mass into pellets, roasting the pellets, steeping and boiling and removing the extractive matter, evaporating the resulting liquor to a thick syrup and drying the syrup in vacuum and reducing to a granular mass or powder, as specified.

2. The process of preparing powdered beverage extract consisting of roasting grains, as wheat and rye, to a light brown color and grinding, cooking figs to a thick syrupy mass, mixing the roasted ground grain therewith and forming the mass into pellets, roasting the pellets, steeping and removing the extractive matter, evaporating the resulting liquor to a thick syrup and drying the syrup in vacuum and reducing to a granular mass or powder, as specified.

In witness whereof, I have hereunto set my hand and seal in the presence of two witness.

JOHN L. KELLOGG. [L. S.]

Witnesses:
LUELLA G. GREENFIELD,
ANNIE E. PARRY.